April 20, 1965 D. E. VARNER 3,178,919
INTEGRAL RESET CONTROL SYSTEM FOR A ROLLING MILL SCREWDOWN
Filed May 25, 1961
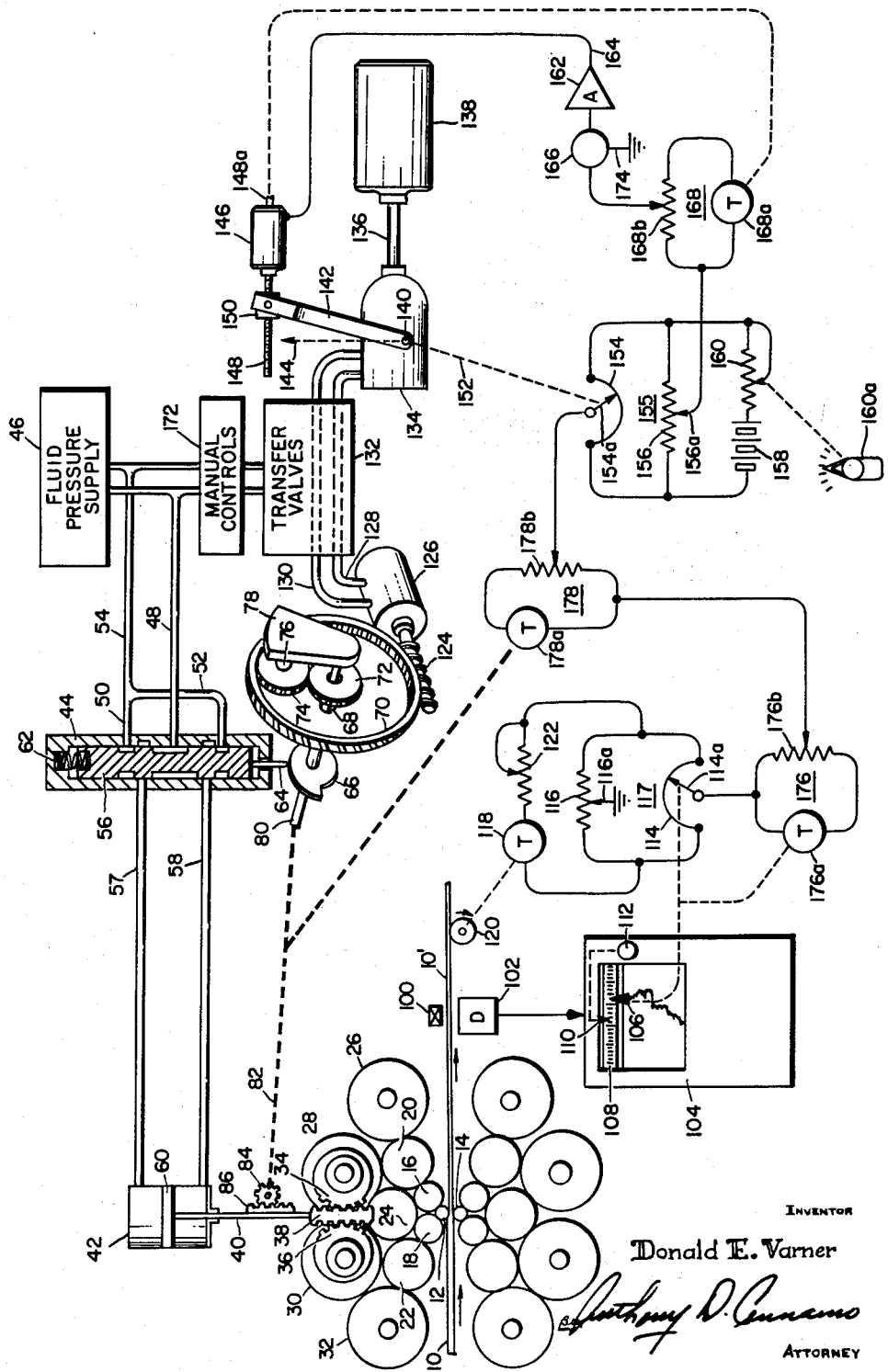
INVENTOR
Donald E. Varner
ATTORNEY

United States Patent Office

3,178,919
Patented Apr. 20, 1965

3,178,919
INTEGRAL RESET CONTROL SYSTEM FOR A ROLLING MILL SCREWDOWN
Donald E. Varner, Columbus, Ohio, assignor to Industrial Nucleonics Corporation, a corporation of Ohio
Filed May 25, 1961, Ser. No. 112,637
5 Claims. (Cl. 72—9)

This is a continuation-in-part of my copending application Serial No. 814,843, filed May 21, 1959, now U.S. Patent No. 3,054,310, granted September 18, 1962.

This invention relates to continuous automatic screwdown controls for strip rolling mills and like apparatus, and more specifically it relates to a novel electro-hydraulic integrating type controller particularly adapted for mills having hydraulically actuated screwdown mechanism.

The invention will be described and illustrated in combination with a cluster mill of the type which is referred to as a Sendzimir mill, this exemplary embodiment having for its purpose the production of rolled metal strip of a constant thickness at any desired value.

A mill of the illustrative type comprises a pair of small diameter work rolls buttressed by opposed clusters of larger back-up rolls. The screwdown adjustments controlling the spacing of the work rolls are effected by changing the angular positions of eccentric bearings which support the back-up rolls. To to this end a hydraulic piston and cylinder type actuator applies a variable pressure through the piston rod thereof, which carries a double-faced rack gear in mesh with a pair of pinion sectors which rotate with the eccentric bearings supporting the back-up rolls. The pressure applied to the piston is automatically controlled by a hydraulic servomechanism having a control input position setting device and means providing inverse feedback of the actuator position so as to maintain the latter substantially constant for a given input position.

In accordance with this invention, the input position setting devide of the hydraulic servo is automatically adjusted to substantially eliminate errors in the output strip thickness by means of the novel integrating computer-actuator of the control system herein described. More specifically, the output strip thickness is measured by an accurate gauging device and the measured thickness is electrically compared with a desired thickness to obtain an electrical error signal voltage which is functional of the thickness deviation of the strip. The error voltage provides the input to an electro-hydraulic integrator having an output shaft which rotates through an angle proportional to the time integral of the error voltage. The angular setting of the output shaft in turn provides the control input to the mill screwdown servomechanism.

The integrator preferably comprises a constant speed motor, a variable displacement hydraulic pump driven by the motor, and a hydraulic motor which is driven in turn by the fluid flow provided by the hydraulic pump. The displacement of the hydraulic pump, that is, the volume of fluid flow per unit time provided thereby, is controlled by a linear electro-mechanical servomechanism which receives the thickness error signal voltage and maintains the hydraulic pump displacement proportional thereto. Basically, the device of the present invention functions as follows:

The thickness of the output strip is measured and indicated by an accurate gauge. The gauge indication is electrically compared with a pre-set, desired thickness indication to develop a difference indication represented by an analog voltage $e$. The voltage is converted by the electro-mechanical servo to a proportional displacement of the hydraulic pump so that the fluid flow per unit time $$\frac{dv}{dt}$$

is related to the voltage $e$ by $$\frac{dv}{dt} = k_1 e \qquad (1)$$

wherein $k_1$ is a first constant. It is to be understood that the term "proportional" is used throughout this specification and the claims in the strict algebraic sense which describes a quantity having both direction and magnitude. Thus in the relation described by Equation 1, for example, it is understood that the fluid flow changes direction when the error voltage $e$ changes polarity or phase.

The total volume of fluid displaced in a given period of time $(t_2-t_1)$ is converted by the hydraulic motor to a proportional positioning of its output shaft, which rotates through an angle $\theta$ such that $$\theta = k_2 \int_{t_1}^{t_2} \frac{dv}{dt} = k_1 k_2 \int_{t_1}^{t_2} e\, dt \qquad (2)$$

The hydro-mechanical mill servo in turn converts the shaft angle to a proportional change in the screwdown position $\Delta S$ such that $$\Delta S = k_3 \theta \qquad (3)$$

Therefore the change in the screwdown position is proportional to the time integral of the error signal, that is $$\Delta S = K \int_{t_1}^{t_2} e\, dt \qquad (4)$$

In accordance with the preferred embodiment of the invention herein described and illustrated, it is found to be advantageous in practice to provide an error signal voltage $e$ which is proportional to the product of the strip thickness error and the linear speed of the output strip, that is $$e = C S_L (W_M - W_D) \qquad (5)$$

wherein $c$ is a constant, $S_L$ is the linear speed of the strip, $W_M$ is the measured thickness of the strip and $W_D$ is the desired thickness thereof. Thus there is provided a controller having automatically variable gain to compensate for variable transportation delay at different rolling speeds of the mill.

It is found, also, that in many mills of the type described, the mechanical portion of the screwdown actuator mechanism is subject to sticking, that is, under the heavy rolling pressures applied, the static frictional forces are much larger than the dynamic frictional forces. Accordingly after the mechanism has been at rest, a large, variable break-away force must be applied to bring about an initial movement, in addition to the increase or decrease in pressure required to complete and maintain a new screwdown setting. Because of the effect of the break-away force the control action will have an undesirable tendency to wander; however, further in accordance with the preferred form of the invention it has been found that said effect can be compensated, and the wandering tendency substantially eliminated, by coupling a tachometer to the screwdown mechanism to provide a signal proportional to the rate of change in the setting thereof, and by feeding said signal back to the input of the controller in opposition to the error signal producing said change.

In addition to its inherent integral action, the preferred controller according to the present invention incorporates suitable derivative action to compensate for phase lag. This derivative action is obtained in what is believed to be a novel manner by providing a tachometer generator, driven by the mechanical thickness indicator mechanism of the gauging device, for providing a derivative signal which is combined with the error signal in a manner so as to augment an increasing error signal and to attenuate a decreasing error signal.

Provision is made also to permit manual adjustment of the constant $c$ by means of an operator's gain control. This makes available convenient and reproducible compensation of the controller characteristics for the many different thicknesses of several different metals which may be run on the same mill at various times.

It is the object of this invention to provide integral reset control for a rolling mill screwdown.

It is another object to provide automatic regulation of a mill screwdown adjustment as a function of the time integral of the error in strip thickness.

It is still another object to provide means for insuring the accuracy of said screwdown adjustment function in spite of a requirement for a substantial, and unpredictably variable breakaway force for effecting an initial movement of the screwdown mechanism.

It is a further object to provide an automatic rolling mill screwdown control whereby the steady state error in strip thickness is always zero.

It is a still further object to provide an integral control system in accordance with the above objects which is compensated for phase lag by a novel derivative signal injection device.

Other objects and advantages of the invention will become apparent in the following description given with reference to the accompanying drawing, in which:

The single figure shows an illustrative rolling mill in combination with a control system in accordance with a preferred form of the invention.

Referring now to the drawing, there is shown a metal strip 10 undergoing reduction between a pair of small diameter work rolls 12 and 14. Each of the work rolls is buttressed by a plurality of increasingly larger rolls including a pair of first intermediate rolls as at 16 and 18, a pair of driven rolls as at 20 and 22 and a second intermediate roll as at 24. Rolls 20–24 are backed up by a set of eccentric bearing assemblies as at 26–32. A similar arrangement supports the bottom work roll 14.

Automatic screwdown control in accordance with this invention may be effected by regulating the angular position of eccentric bearing assemblies 28 and 30. To this end, corresponding opposed pinion sectors 34 and 36 are adapted for rotation energized by linear movement of a double-faced rack gear 38 connected to the piston rod 40 of a piston and cylinder type hydraulic actuator 42.

The fluid pressure applied to each of the two ends of the cylinder 42 is determined by the setting of a four-way valve 44. Valve 44 receives a continuous flow of fluid under pressure from a supply 46 thereof delivered by pressure line 48, and discharges fluid into branches 50 and 52 of a return pipe 54. The position of the spool 56 in valve 44 determines the portion of the total fluid pressure drop between lines 48 and 50 which is applied to the top end of cylinder 42 through a pipe 57. Similarly the spool poistion determines the portion of the total fluid pressure drop between lines 48 and 52 which is applied to the bottom end of the cylinder through pipe 58. When the spool 56 is effectively centered in the valve body 44, the pressure on the top side of piston 60 is essentially equal to the pressure on the bottom, and the piston rod 40 exerts no force in either direction. When the spool 56 is displaced from center, the pressure on one side of the piston 60 will increase and the pressure on the other side will decrease in linear relation to the amount of displacement of the spool.

The spool 56 is biased downwardly by a spring 62, thereby pressing an associated cam follower 64 against the periphery of a cam 66. Cam 66 is secured to a tubular shaft 68 which is journaled in the hub of a ring gear 70. A sun gear 72 is secured to the end of shaft 68, and a planetary gear 74 meshes with the sun gear and the ring gear 70. The planetary gear 74 is journaled on a stub shaft 76 which is secured to a sector arm 78. The sector arm is in turn secured to a shaft 80 which is journaled in the hollow cam shaft 68 and connected as indicated by the dotted line 82, to a pinion gear 84 which meshes with a rack gear 86 secured to the piston rod 40 of the screwdown actuator.

The above described apparatus constitutes a servo-mechanism adapted to maintain a constant screwdown setting regardless of changes in the thickness, hardness, and/or tensioning of the strip 10 being fed through the work rolls 12 and 14 of the mill. Such changes of course tend to alter the separating force exerted between the work rolls. A change in the separating force is reflected through the intermediate rolls so as to upset the torque balance on the eccentric roll support bearings 28 and 30.

That is to say, the roll separating force produces a torque on the eccentric bearings which is balanced by the opposing torque exerted on pinion sectors 34 and 36 by the differential pressure on the piston 60 acting through the piston rod 40 and rack gear 38. Hence if the torque balance is upset by a change in the rolling pressure, it will tend to result in a movement of piston rod 40. However, a slight movement of the piston rod and gear rack 86 secured thereto will cause rotation of pinion 84, shaft 80 and sector 78, thus carrying the axis of planetary gear 74 around the sun gear 72. Since ring gear 70 is assumed to be held stationary, the sun gear 72 must rotate, thus altering the angular position of cam 66 which in turn changes the position of the spool 56 of the four-way valve 44. Hence if the change in mill forces tended to produce upward movement of the piston 60, the action of the four-way valve will increase the fluid pressure on the top of the piston and reduce the pressure on the bottom thereof, thus substantially restoring the piston to its original position.

It is apparent that the nominal gap between the work rolls can be reset by rotating the ring gear 70 to a new angular position, whereupon the follow-up action of the servo will cause the piston 60 to assume a new vertical position which will be automatically maintained as above described.

The effectiveness of the self-regulating action provided by the mill servo, however, is limited by several factors. As a position follower device, the hydraulic servo has a high gain when there is no load on the piston rod 40, but it is apparent that the gain decreases with increasing load on the piston, for the simple reason that the four-way valve spool must be displaced from center a greater amount in order to create a greater differential pressure on the piston. Moreover, changes in rolling pressure produce appreciable changes in the amount of "spring" or elastic stretching of the mill frame (not shown). The changes in the work roll opening allowed by the spring of the mill may not cause any rotation whatever of the feedback pinion 84, and hence go uncompensated. It is also true that if the entering strip 10 exhibits changes in elasticity, the thickness of the output strip 10' will vary even though the roll opening remains constant. Hence the hydraulic servo system requires resetting in accordance with continuous measurements of the output strip thickness.

Accordingly an accurate gauge, preferably a radioisotope thickness gauge such as is described in U.S. Patent No. 2,790,945, issued April 30, 1957 to Henry R. Chope, is installed on the strip output side of the mill. Such a gauge comprises a radiation source 100 and a detector 102 positioned on opposite sides of the strip 10', the detector 102 being connected to a continuous recording device 104 having a laterally movable, motor driven pointer 106 for indicating the instantaneous thickness of the strip 10' with reference to a calibrated scale 108. The recorder is also provided with a target indicator 110 which is adjustable by means of a knob 112 whereby the operator sets the desired strip thickness value into the controller.

The gauge indicator 106 is mechanically connected to the movable tap 114a of repeat slidewire 114, and the target indicator 110 is similarly connected to the movable tap 116a of a potentiometer 116. The potentiometer 116 and slidewire 114 constitute a bridge circuit 117 energized by a D.C. tachometer generator 118 which may be driven by an idler roll 120 in tractive engagement with the strip 10′. The tachometer output is connected across the bridge through a dropping rheostat 122.

The slidewire 114 and potentiometer 116 are mechanically and electrically matched so that when the pointers 106 and 110 are in alignment at any point on scale 108 the bridge circuit is balanced and taps 114a and 116a are at the same potential. However, assuming a constant voltage output from generator 118, if the gauge indicator 106 deviates from the desired thickness reading shown by the position of target pointer 110, a potential difference occurs between taps 116a and 114a which is proportional to the amount of the deviation. But, since the tachometer output is proportional to the rate of travel of the strip 10′ it is seen that the potential between the taps is in fact proportional to the product of the deviation and the strip speed. Thus if tap 116a is grounded as shown, the potential of tap 114a with respect to ground provides an error voltage essentially as in Equation 5 hereinabove.

In order that the angular position of ring gear 70 may be reset as necessary in accordance with the time integral of the error voltage appearing at tap 114a, it is seen that the outer periphery of ring gear 70 has helically cut teeth which mesh with the worm shaft 124 of a hydraulic motor 126. The hydraulic motor is connected by inlet and outlet pipes 128 and 130 to a set of transfer valves indicated by box 132 which permit the screwdown setting to be adjusted either automatically or manually as explained hereinafter. In the automatic mode, the position of the transfer valves is such that pipes 128 and 130 are directly connected, as shown by the dotted lines passing through box 132, to a variable displacement hydraulic pump 134.

The motor 126 and pump 134 are commercial items of manufacture such as are available, for example, from Vickers Incorporated, Detroit, Michigan. The pump shaft 136 is continuously driven by a constant speed electric motor 138. The pump 134 is provided with a control shaft 140 to which is secured a control arm 142. When the arm 142 is located in a center position indicated at 144, the pump has zero displacement, and accordingly the hydraulic motor worm shaft 124 is at a standstill. If the arm 142 is moved from the center position in one direction, fluid is forced through the motor 126 from pipe 128 to pipe 130. If the arm 142 is moved from the center position in the opposite direction, the fluid flow is reversed, entering the motor through pipe 130 and returning to the pump 134 through pipe 128. The fluid flow causes rotation of the motor shaft in a direction determined by the direction of the fluid flow. The rate of rotation is determined by the volume of circulating fluid per unit time, which in turn is determined by the displacement of pump 134. The pump displacement is proportional to the distance the control arm 142 is moved from its center position 144.

The hydraulic pump displacement control arm 142 is automatically repositioned as necessary by an electromechanical servomechanism which includes an electric servo motor 146 for driving a screw shaft 148. The screw 148 carries a traveling nut 150 which is journaled in the bifurcated end-portion of the control arm 142. To provide an electrical analog of the position occupied by the control arm 142, the associated control shaft 140 of the hydraulic pump is mechanically connected as indicated by the dotted line 152 to the movable tap 154a of a slidewire potentiometer 154.

Slidewire 154 is connected in a bridge circuit 155 with a potentiometer 156, the bridge being energized by a voltage source 158 which is connected through a rheostat 160. The mechanical connection 152 is made so that the slidewire arm 154a is in the center of its travel when the pump control arm 142 is in the center position 144. Potentiometer 156 is then adjusted to correct any slight mechanical-electrical misalignment, so that the bridge 155 is balanced and the voltage between slidewire tap 154a and potentiometer tap 156a is zero when the pump 134 operates with zero displacement.

The servo motor 146 is driven by the output of a servo amplifier 162 as is indicated by connection 164. The amplifier system is preferably of the type having a chopper modulator input, as is indicated by the representation of a chopper 166, in combination with an "infinite" forward gain amplifier having relay type phase demodulator output stage (not shown). This system is fully described in Patent No. 2,955,206. The input circuit of the amplifier system includes a conventional tachometer network 168 including a tachometer generator 168a which is driven by an extension 148a of the screw 148 shaft of the servo motor 146 as is indicated by the dotted line 170. The tachometer network is in turn connected to the tap 156a of potentiometer 156 in the bridge circuit 155.

It should be recognized immediately that motor 146, bridge circuit 155, amplifier 162 system and tachometer network 168 constitute a conventional electromechanical servomechanism of the type basically disclosed and fully explained in U.S. Patent No. 2,113,164. Accordingly the operation of this servomechanism per se need be only very briefly described as follows.

Assume for the moment that line 172 is disconnected from the tap 154a of slidewire 154 and that a control voltage $e_c$ is applied between the tap 154a and the grounded lead 174 of chopper 166. (These points constitute the input of the electromechanical servomechanism per se.) If the control voltage is zero, as would be the case if tap 154a were shorted to ground, the servomechanism will automatically drive the hydraulic pump displacement control arm 142 and the connected slidewire tap 154a to a position where the bridge 155 is balanced and there is no potential difference between potentiometer taps 154a and 156a. When the bridge is balanced and servo motor 146 stops, the control arm 142 should be located in the center, zero displacement position indicated at 144. The zero displacement condition is indicated when the hydraulic motor 126 is at a standstill; if this is not the case, the potentiometer 156 is readjusted manually to the point where the hydraulic motor stops.

Now assume that a control voltage $e_c$ which is not zero is applied to the input of the electromechanical servomechanism. The servo motor 146 then immediately drives the slidewire tap 154a to a new position, unbalancing the bridge 155 by an amount such that the potential between taps 154a and 156a is equal and opposite to the control voltage $e_c$. The new position of tap 154a is displaced from the balance position by a distance proportional to the magnitude of $e_c$, and the direction of displacement of course depends on the algebraic sign of $e_c$. It is apparent that if $e_c$ is held constant, the servo motor 146 immediately comes to rest when the output of the bridge 155 is minus $e_c$. However, since the hydraulic pump displacement control arm 142 now occupies a new position to one side or the other of the center, zero displacement position, the pump 134 is continuously providing a fluid flow proportional in magnitude and direction to the control voltage $e_c$. This fluid flow is causing the hydraulic motor 126 to operate continuously with a speed and direction proportional to $e_c$. Likewise, due to the follow-up action of the hydromechanical mill servomechanism, the screwdown setting is continuously changing in a direction and at a rate proportional to $e_c$. The "gain" of the cascaded electromechanical and hydromechanical servomechanisms may be expressed in terms of the last proportionality. That is, the gain may be given as so many thousandths of an inch of screwdown movement, per second, per volt of the applied control signal $e_c$. The amount of gain is adjustable by means of rheostat 160 which determines the voltage across the bridge circuit 155 and thus determines the distance the arm 142 and the tap 154a must move from the zero balance position in order to null a given value of the control signal $e_c$ voltage.

Nominally the control signal voltage $e_c$ is the error voltage $e$ of Equation 5 hereinabove. However, the error voltage $e$, which is already compensated for changes in rolling speed by the use of tachometer 118, is further compensated for the effects of the controller phase lag and the screwdown break-away force by a pair of additional tachometer networks 176 and 178 respectively. The network 176 comprises an error rate signal network energized by a tachometer generator 176a which is driven by the servomotor (not shown) of the thickness gauge recorder 104, which also drives the recorder indicator 106 and the repeat slidewire tap 114a in bridge circuit 117. An adjustable potentiometer 176b is connected across the tachometer generator whereby an adjustable portion of the output voltage thereof may be added in series with the signal voltage $e$ In a similar manner, there is added a portion of the output of a tachometer generator 178a in network 178, the generator being driven by a mechanical connection to gear 84 and shaft 80 which rotate with movement of the mill screwdown mechanism.

The input circuit of the controller servo amplifier 162 system is traced from the variable tap 116a of target setting potentiometer 116 in bridge circuit 117, through the bridge circuit to tap 114a, through tachometer network 176, through tachometer network 178, through bridge circuit 155, through tachometer network 168 and chopper 166 to ground lead 174 and ground return to tap 116a.

It is seen that the control signal $e_c$ which appears on line 172, comprising the input to the electromechanical servomechanism, is the indication of a composite of four variables, that, is, the strip thickness error, the strip speed, the rate of change in the thickness error, and the rate of change in the position of the mill screwdown. The strip thickness error is indicated by its mechanical analog comprising the distance between the measured thickness indicator 106 and the target thickness indicator 110. The tachometer 118 and bridge network 117 multiplies the thickness error by the strip speed, whereby the product of these two variables is indicated by the analog voltage at tap 114a. The error rate tachometer network 176 adds to said product analog voltage a rate signal voltage indicative of the rate of change of thickness error per se. The error rate signal voltage is added with an algebraic sign such that said product analog voltage is augmented when the error is increasing, whereas it is attenuated or opposed when the error is decreasing. The screwdown rate tachometer network 178 adds a screwdown rate signal voltage with an algebraic sign such that when the screwdown setting is being changed as a result of the combined output of bridge 117 and network 176, the screwdown rate signal voltage opposes or attenuates said combined output which is producing such change in the screwdown setting.

For the purpose of summarizing the operation of the system, it is first assumed that the thickness of the output strip 10' has the correct value indicated by the setting of target indicator 110 with respect to scale 108. The gauge pointer 106 will accordingly indicate the same value, that is, both pointers will be in vertical alignment. The voltage outputs of bridge circuits 117 and 155 will both be zero, the servo motor 146 will be at rest, the control arm 142 of the hydraulic pump will be located in the center position 144, the pump 134 will have zero displacement, and hydraulic motor 126 will also be at rest, thus holding ring gear 70 in a fixed position. Accordingly the position of the screwdown actuator piston rod 40 remains relatively constant.

Now assuming, for example, that the input strip 10 exhibits a substantial change in thickness or hardness, the thickness of the output strip 10' will reflect such change as hereinabove explained, and a concomitant change in the amount of radiation incident on the detector 102 will cause the gauge pointer 106 to deviate from its alignment with target pointer 110. The upset of the balanced condition of bridge circuit 117 results in a voltage at the tap 114a of repeat slidewire 114 which is proportional to the product of the thickness deviation and the speed of the output strip 10'. At the same time, the movement of pointer 106 is accompanied by rotation of tachometer generator 176a, resulting in an output voltage from network 176. The synergetic outputs of bridge 117 and network 176 are delivered as a control voltage to the input 172 of the electromechanical servomechanism via network 178 which comprises only a passive impedance in the absence of movement of the screwdown mechanism. The presence of the control voltage causes servo motor 146 to rotate in a direction such that the slidewire tap 154a seeks a new position wherein its potential is equal and opposite to the control voltage.

Operation of the servo motor 146 displaces the nut 150 and pump control arm 142 so that fluid is forced through the hydraulic motor 126, thus rotating ring gear 70. Since the screwdown actuator piston 40 is assumed to be initially held stationary, gears 86 and 84, shaft 80 and sector arm 78 are also initially fixed; therefore rotation of ring gear 70 will cause rotation of sun gear 72 and cam 66, displacing spool 56 of the four-way valve 44. This causes the differential fluid pressure on the piston 60 to change until the sticking force is overcome, eventually producing a movement of the screwdown mechanism which in turn is fed back through the servo gears to cam 66 and the four-way valve. The feedback inherent in the mill servo will thus tend to stabilize the screwdown position at a new setting depending on the new position of ring gear 70, the new setting being displaced from the old setting in a direction such that the error in strip thickness is reduced. Simultaneously, with the movement of the screwdown mechanism the tachometer network 178 injects a voltage which opposes the combined output of bridge circuit 117 and tachometer network 176. The movement of the screwdown mechanism also quickly corrects the tendency of the strip thickness to change, whereupon as the thickness gauge pointer 106 stops its movement the tachometer network 176 ceases to provide the error rate signal voltage. As the net control signal on line 172 is reduced, the servomotor 146 reverses its direction of rotation to correspondingly reduce the output of bridge circuit 155 and to return the control arm 142 of the pump 134 toward the zero displacement position, thus slowing down the hydraulic motor 126 and reducing the rate of readjustment to the screwdown which is being applied by the mill servo.

As the strip thickness changes in a direction to reduce the error therein, the gauge pointer 106 approaches the position of target pointer 110, reducing the output of the bridge circuit 117. Moreover at this time both tachometer networks 176 and 178 tend to null said output. Accordingly, the control signal on line 172 will be reduced to zero even though the gauge pointer 106 may still indicate an error. Thus the controller anticipates that the thickness error will be eliminated, and the action of the cascaded servos brings the screwdown mechanism to rest in a new position which is displaced from the original position by an amount proportional to the time integral of the measured error, in spite of the various delays in the control system and the tendency of the screwdown to stick because of static friction.

The selection of an electromechanical servomechanism employing the tachometer feedback network 168, whereby the servo motor 146 speed is dependent to an adjustable degree on the amplitude of the control signal, results in a highly versatile control system, in that the response characteristics of the servo can be readily modified to adapt the controller to different types of mills or different operating conditions by a simple adjustment of potentiometer 168b in the tachometer network.

The rolling of different widths and thicknesses of various materials on the mill requires a controller operable with different integration coefficients, that is, a selectable gain, as pointed out hereinabove. Accordingly, rheostat 160 in the bridge circuit 155 is adapted to provide the machine operator with a readily accessible gain adjustment dial setting knob 160a. Rheostat 122 in bridge circuit 117 provides a coarse gain adjustment whereby rheostat dial 160a may be suitably calibrated on installation of the controller.

Although the motor 138 is essentially a constant speed motor as aforesaid, in cases where widely different thicknesses of strip are rolled at various times on the same mill it has been found necessary to provide some type of speed selector whereby the pump 134 may be driven at a constant, slow speed while rolling thin materials, or at a constant, fast speed while rolling thicker materials. Accordingly, the drive motor 138 may be of a variable speed type with a speed selector, or a selective gear transmission may be installed between the motor 138 and the pump 134.

Whenever the operator is required to perform the screwdown adjustment by manual means, the automatic-manual transfer valves represented by box 132 may be actuated to a manual position. In the manual position, the fluid flow provided by hydraulic pump 134 is by-passed around the same, and the hydraulic motor 126 is connected to the fluid pressure line 48 and return pipe 54 of the fluid pressure supply 46 through manual screwdown open and close valves represented by box 172. Thus in the manual mode, the motor 126 may be operated in either direction utilizing the fluid pressure supply which energizes the mill servo.

While the embodiment of the invention herein described is utilized on combination with a rolling mill having a screwdown mechanism which is characterized by the requirement of a breakaway force, in other types of mills, for example, that shown in FIG. 1a of British Patent No. 647,606, the break-away force requirement is negligible. Obviously, therefore, when the control system of the invention is utilized in combination with such other types of mills, the screwdown tachometer network 178 is not required and may be omitted.

While the invention is herein shown and described as embodied in a specific device, such showing and description is meant to be illustrative only and not restrictive, since clearly a great many changes, modifications, and outwardly quite different embodiments can be made without departing from the spirit and scope of the invention as is set forth in the appended claims.

What is claimed is:

1. In a control system for a strip rolling mill wherein an error signal representing the thickness deviation of the strip at the output of the mill is fed back to control the spacing between the work rolls of the mill, the improvement of means for multiplying said error signal by the linear speed of said output strip to provide a signal proportional to the product of said thickness deviation and said strip speed, means receiving said product proportional sginal for computing a time integral thereof and for adjusting said work roll spacing by an amount proportional to said integral, means for generating a thickness error rate signal proportional to the rate of change of only said thickness deviation exclusive of changes in said strip speed, and means for adding said rate of change proportional signal to said product proportional signal received by said integral computing and work roll spacing adjusting means to compensate for phase lag in the operation thereof.

2. Apparatus as in claim 1 wherein said thickness error rate signal generating means comprises gauging means having an indicator for the thickness of said strip, and a tachometer generator driven by mechanical movement of said indicator.

3. In a control system for a strip rolling mill having a screwdown mechanism capable of continuous operation to vary the spacing between the work rolls of the mill but which requires a break-away force to overcome static friction in addition to the normal adjusting force to effect an initial movement of said screwdown mechanism, and wherein an error signal representing the thickness deviation of the strip of the output of the mill is fed back to control the operation of said screwdown mechanism, means receiving said error signal for computing a time integral thereof and for adjusting said screwdown mechanism in an amount proportional to said integral, means for generating a screwdown rate signal proportional to the rate of adjustment of said screwdown mechanism, means for combining said screwdown rate signal with said error signal received by said integral computing and screwdown mechanism adjusting means, said signals being combined in opposition so as to correct said integral and said proportional screwdown movement for the effect of said break-away force.

4. Apparatus as in claim 3 which includes means for generating a thickness error rate signal proportional to the rate of change of said thickness deviation, and means for adding said error rate signal to said combined error and screwdown rate signals received by said integral computing and screwdown adjusting means so as to compensate for phase lag in the operation thereof.

5. In a control system for a strip rolling mill having a screwdown mechanism capable of continuous operation to vary the spacing between the work rolls of the mill but which requires a break-away force to overcome static friction in addition to the normal adjusting force to effect an initial movement of said screwdown mechanism, and wherein an error signal representing the thickness deviation of the strip at the output of the mill is fed back to control the operation of said screwdown mechanism, means for multiplying said error signal by the linear speed of said output strip to provide a signal proportional to the product of said thickness deviation and said strip speed, means for computing a time integral of said product proportional signal and for adjusting said screwdown mechanism in an amount proportional to said integral, means for generating a screwdown rate signal portional to the rate of adjustment of said screwdown mechanism, means for combining said screwdown rate signal with said product proportional signal in opposition thereto so as to correct said integral and said proportional screwdown movement for the effect of said break-away force, means for generating a thickness error rate signal proportional to the rate of change of said thickness deviation, and means for adding said error rate signal to said combined product proportional and screwdown rate signals to compensate for phase lag in the operation of said integral computing and screwdown adjusting means.

References Cited by the Examiner

UNITED STATES PATENTS

| | | | |
|---|---|---|---|
| 2,479,974 | 8/49 | Sendzimir et al. | 80—32 |
| 2,830,249 | 4/58 | Peterson | 318—307 |
| 2,999,406 | 9/61 | Warren | 80—35.1 |

FOREIGN PATENTS 607,961  11/60  Canada.

OTHER REFERENCES

Pages 95 and 96 (1960) Control Engineering.

WILLIAM J. STEPHENSON, *Primary Examiner.*

LEON PEAR, CHARLES W. LANHAM, *Examiners.*